(12) United States Patent
Kleinhans et al.

(10) Patent No.: US 6,950,131 B1
(45) Date of Patent: Sep. 27, 2005

(54) SIMULTANEOUS ACCESS AND RESET SYSTEM FOR AN ACTIVE PIXEL SENSOR

(75) Inventors: William A Kleinhans, Thousand Oaks, CA (US); Tina Y Liu, Tarzana, CA (US)

(73) Assignee: Valley Oak Semiconductor, Westlake Village, CA (US)

( * ) Notice: Subject to any disclaimer, the term of this patent is extended or adjusted under 35 U.S.C. 154(b) by 774 days.

(21) Appl. No.: 09/670,797

(22) Filed: Sep. 26, 2000

(51) Int. Cl.[7] .................. H04N 5/217; H04N 5/335; H04N 3/14; H01L 27/00
(52) U.S. Cl. .................. 348/241; 348/296; 348/302; 250/208.1
(58) Field of Search .................. 348/241, 250, 348/294, 296, 300, 301, 302, 307, 308, 310; 250/208.1

(56) References Cited

U.S. PATENT DOCUMENTS

| | | | |
|---|---|---|---|
| 4,445,117 A | | 4/1984 | Gaalema et al. |
| 4,810,896 A | | 3/1989 | Tanaka et al. |
| 5,083,016 A | | 1/1992 | Wyles et al. |
| 5,262,870 A | | 11/1993 | Nakamura et al. |
| 5,434,619 A | * | 7/1995 | Yonemoto .................. 348/241 |
| 5,539,461 A | | 7/1996 | Andoh et al. |
| 5,631,704 A | * | 5/1997 | Dickinson et al. .......... 348/308 |
| 5,698,844 A | * | 12/1997 | Shinohara et al. .......... 348/300 |
| 5,880,460 A | * | 3/1999 | Merrill .................. 348/308 |
| 5,962,844 A | * | 10/1999 | Merrill et al. .............. 348/308 |
| 5,965,871 A | * | 10/1999 | Zhou et al. .............. 250/208.1 |
| 6,067,113 A | * | 5/2000 | Hurwitz et al. ............. 348/241 |
| 6,218,656 B1 | * | 4/2001 | Guidash .................. 348/308 |
| 6,493,030 B1 | * | 12/2002 | Kozlowski et al. .......... 348/310 |
| 6,529,242 B1 | * | 3/2003 | Panicacci .................. 348/308 |
| 6,538,693 B1 | * | 3/2003 | Kozuka .................. 348/241 |
| 6,587,146 B1 | * | 7/2003 | Guidash .................. 348/308 |
| 6,603,513 B1 | * | 8/2003 | Berezin .................. 348/308 |
| 6,710,804 B1 | * | 3/2004 | Guidash .................. 348/302 |
| 6,803,952 B1 | * | 10/2004 | Watanabe .................. 348/241 |
| 6,809,766 B1 | * | 10/2004 | Krymski et al. ............. 348/296 |

OTHER PUBLICATIONS

"A Pixel Size Shrinkage of Amplified MOS Imager with Two Line Mixing", Yamawakiet al. IEEE Transactions on Electron Devices, vol. 43, No. 5 May 1996, pp 713-719.

* cited by examiner

*Primary Examiner*—Wendy R. Garber
*Assistant Examiner*—John M. Villecco
(74) *Attorney, Agent, or Firm*—Allan Jacobson

(57) ABSTRACT

A semiconductor chip for forming an electronic image in a digital camera includes an offset canceling column buffer for use with active pixel sensors having a small electrical buffer amplifier within each pixel The active pixel sensors are arranged on a semiconductor chip with simultaneous access and reset lines. Each active pixel sensor includes an source follower current amplifier, which introduces small variations in offset voltage, causing pattern noise to be introduced into the output signal of the sensed image. A method and apparatus is disclosed for addressing an array of active pixel sensors in a sequence coordinated with a column buffer for canceling pattern noise. To cancel pattern noise, the current row N in the APS cell array is accessed and sampled. Next, the following row N+1 is accessed thereby resetting the current row. Finally, the previous row N in the APS cell array is accessed a second time and sampled. Stored samples from the prior row N are subtracted from the previously sampled signals of the same prior row N to provide an output pixel signal value for which the APS offset voltage (pattern noise) is cancelled. In addition, accessing a row of the APS cell array M+1 rows ahead of the current row N electronically controls image exposure time, which is equal to M times the row scan rate.

7 Claims, 6 Drawing Sheets

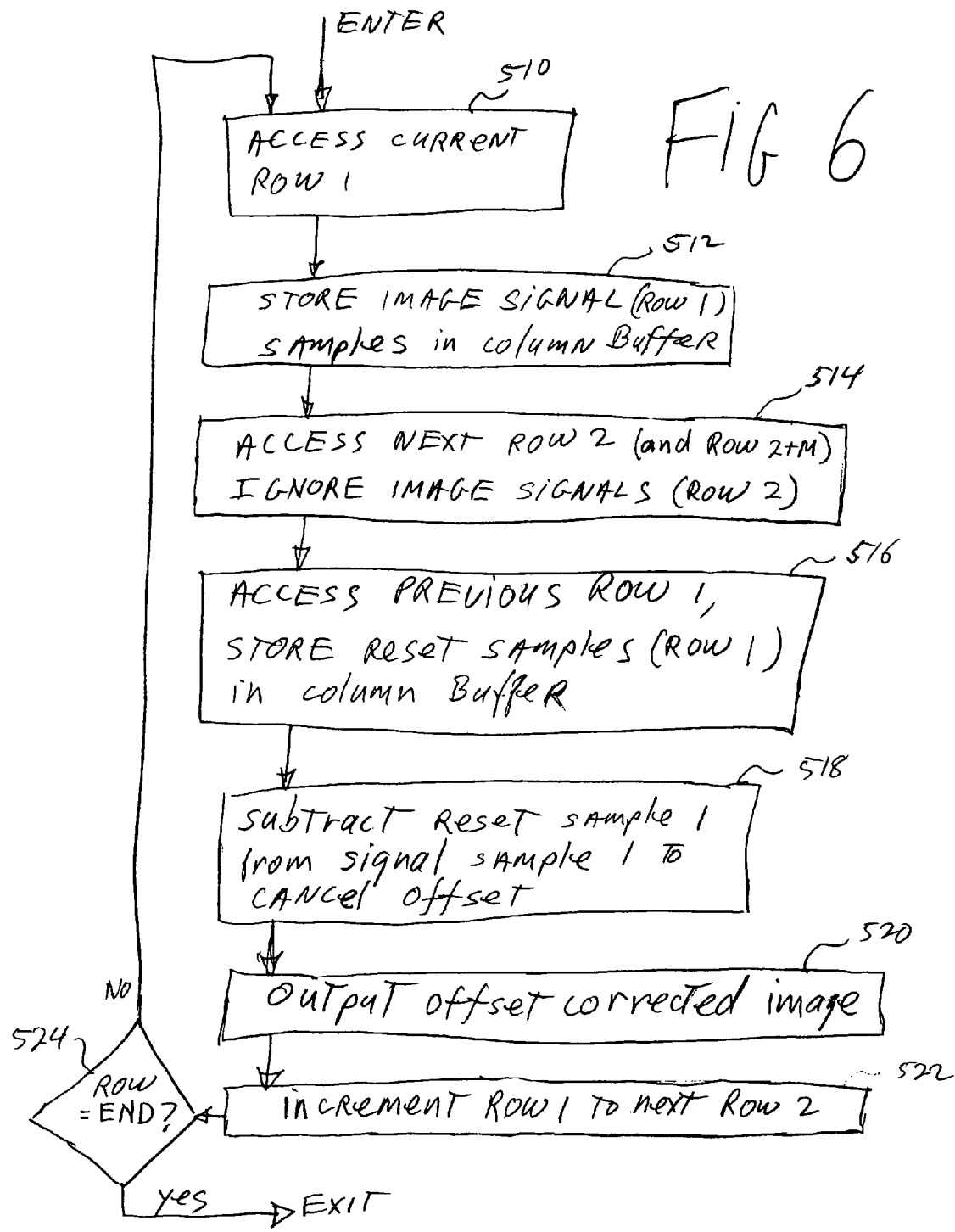

SIMULTANEOUS ACCESS AND RESET SYSTEM FOR AN ACTIVE PIXEL SENSOR

FIELD OF INVENTION

The present invention relates to a semiconductor chip for forming an electronic image in a digital camera. More specifically, the present invention relates to an offset canceling column buffer for use with active pixel sensors having a small electrical buffer amplifier within each pixel.

BACKGROUND OF THE INVENTION

A semiconductor imaging chip is an integrated circuit containing a two dimensional array of photosensitive diodes and amplifiers known as "active pixel sensors" (APS). A "pixel" is a single picture element, such as one dot of a given color. The imaging chip is placed in the focal plane of a digital camera and exposed to an image during the camera shutter time interval. Diodes in the silicon substrate detect the light, and generate electrons, which accumulate negative charge on n-type junctions in the semiconductor circuit substrate.

Initially, the photodiodes are reset to a positive voltage. If a mechanical or electromechanical shutter is used, the shutter is opened and a focused image is projected onto the surface of the chip. Incident light discharges the initial positive voltage on each photodiode by an amount proportional to the total light flux during the time that the camera shutter is open (called the image exposure time or shutter time interval). In an electronic camera using a semiconductor imaging chip, the mechanical shutter may be eliminated. A mechanical shutter is simulated by resetting a given photodiode, and then reading out the voltage on the photodiode a short time later. The time between reset and readout is the image exposure time for that particular photodiode.

The photodiode array is arranged in rows and columns. The resulting voltage on each of the photodiodes is read out by means of scanning and signal processing circuits, which are typically included on the imaging chip. Individual APS cells are addressed by accessing each row of the APS cell array individually and sensing the respective outputs of the corresponding APS cells in the selected row from the plurality of columns in the array.

APS Cell

Each APS cell contains a photodiode and a small amplifier formed by field effect transistors (FET) operated as a source follower (a current amplifier) circuit. A suitable active pixel sensor containing a photodiode and four transistors forming a source follower amplifier circuit is disclosed in U.S. Pat. No. 4,445,117 to Gaalema et al. The disclosed APS cell includes a first control line to access the photodiode during readout, and a second separate control line to reset the photodiode after readout in preparation for the next image exposure. The advantage of the APS cell shown by Gaalema et al., is that it uses metal oxide semiconductor field effect transistors (MOSFET), instead of the charged coupled devices (CCD) of the prior art.

Improved APS Cell Array

An improvement to the layout of the APS cell of Gaalena et al. is disclosed in U.S. Pat. No. 5,083,016 to Wyles et al. The circuit layout efficiency of the array of Gaalena APS cells is improved by Wyles by merging the access and control lines into single access/control lines. That is, the access line of the current row of APS cells is merged with the reset line of the previous row of APS cells into single access/reset line that performs both functions. Thus in Wyles et al., each access/reset control line simultaneously accesses the current row of APS cells and resets the previous row of APS cells, thereby improving layout efficiency, especially for large arrays of very small pixels.

However, by merging access and reset control lines the operational flexibility of having separate control lines to independently reset and access the current APS cell on separate lines is lost. For example, merged access and reset control lines impede the ability to control the image exposure time. Normally, rows of pixels are held in reset until ready to begin sensing light. However, holding a row of pixels in a reset condition is not possible when using merged access and reset control lines, because holding a merged access/reset control line in a reset condition for one APS cell would interfere with reading (accessing) the adjacent APS cells in the next row. With respect to pattern noise, the perceived disadvantage due to the merged access and control lines is that it is no longer possible to observe the reset value of the current pixel. Merged access and reset control lines impedes the ability to cancel pattern noise and control image exposure time.

Source of Pattern Noise in CMOS Semiconductor Imaging Chips

Pattern noise results from the small differences between individual FET transistors in each APS cell. In particular, each source follower buffer in each APS cell will have a (different) offset voltage between the photodiode voltage and the output column bus voltage, which offset voltage is equal to about one gate-to-source threshold of the FET source follower transistor. Since there are random variations of the offset voltage between individual FET transistors on the order of some tens of millivolts, the random offset voltages produce a fixed pattern of noise arising from the imaging chip itself, which pattern noise will be superimposed on the imaged illumination. The pattern noise caused by the variation in APS offset voltage is unacceptably large for most applications, and particularly in the case of low power cmos semiconductor fabrication.

As indicated, in a conventional APS cell, there are separate bus lines for access and reset control functions. Conventionally, these separate lines are used to cancel the pattern noise caused by the random source follower offset voltages of each APS cell. The pattern noise is cancelled by reading out the APS pixel signal value and sampling it (using the access control line), then resetting the APS (using the reset control line), and sampling the APS reset signal value immediately after the reset (using the access control line). In such manner, the signal value from the APS cell is sampled before, during and after the current APS cell is reset.

The difference between the sampled (stored) APS pixel signal value and the measured offset voltage in the reset condition (the stored APS reset signal value) is proportional to the true pixel (photodiode) illumination. By taking the difference between the previously stored sampled APS pixel signal value and the current APS reset signal value, an output pixel signal value is produced in which the source follower buffer offsets are cancelled. In other words, by subtracting the reset signal value of the current APS cell from the pixel signal value of the current APS cell, the pattern noise due to the source follower offset is cancelled. However, to use the above process to eliminate pattern noise, separate access and reset control lines to the current APS cell are needed.

SUMMARY OF THE INVENTION

The present invention is embodied in a semiconductor chip with simultaneous access and reset lines. In particular, the invention is embodied in a method and apparatus for addressing an array of active pixel sensors in a sequence coordinated with a column buffer for canceling pattern noise.

First, the current row N in the APS cell array is accessed and sampled. Next, the following row N+1 is accessed, but not sampled. Instead, the APS pixel signal value from row N+1 is ignored. The purpose of accessing row N+1 is to reset the previous row, N.

Next, the previous row in the APS cell array is accessed and sampled. Since the most recent row sampled is N+1, the prior row is now row N. Since row N is now being access after row N+1 was accessed (i.e., a second subsequent row access of row N), the APS signal value at row N is the APS reset signal value of row N. Stored samples from the prior row N are subtracted from the previously sampled signals of the same prior row N to provide an output pixel signal value for which the APS offset voltage is cancelled.

Thus, the addressing sequence is N, N+1, N, N+1, N+2, N+1, N+2, N+3, N+2 and so on. In accordance with the present invention, the pattern of APS row addressing is two steps forward and one step back advancing through the address space 2 rows for each 3 rows accessed. In particular:

Pixel row N is output after rows N, N+1 and N are accessed,
Pixel row N+1 is output after rows N+1, N+2 and N+1 are accessed, and
Pixel row N+2 is output after rows N+2, N+3 and N+2 are accessed.

Each column buffer has a first memory element for storing the APS pixel signal value following the first access of row N. Each column buffer further has a second memory element for storing the APS reset signal value following the second access of row N (the measured offset value). Each column buffer further includes apparatus to subtract the measured offset value from the measured APS pixel value to provide a corrected APS pixel signal value output (corrected for pattern noise).

In accordance with another aspect of the present invention image exposure time is controlled by simultaneously resetting a row to be scanned one shutter time in the future, while simultaneously scanning the current row. In particular, a row located a given distance (M rows) from the current row (N) is accessed at the same time that the current row is reset by accessing the row following the current row. That is, row N+1+M is accessed while accessing row N+1 the first time. Row N+1+M is not accessed while accessing row for N+1 the second time. The purpose of simultaneously accessing N+1+M is to reset the prior row, N+M at the beginning of the shutter time interval.

First, the current row N in the APS cell is accessed and sampled. Next, the following row, N+1, is accessed, but not sampled. As before, the purpose of accessing row N+1 is to reset the previous row, N, so that its reset value will be subsequently available for pattern noise cancellation. At the same time, row N+M+1 is also accessed, so that row N+M will be reset to initiate its image exposure time interval. M rows later, the signal on this row (N+M) will be read and sampled, so its image exposure time interval will be the time it takes to scan M rows of the photodiode array.

Next, row N in the APS array is accessed and sampled again. This time row N contains the reset voltage for row N. Both the signal and reset values for row N are now stored in the column buffer. The respective signal and reset values for row N are subtracted, providing an output pixel signal value from which the APS offset voltage is cancelled. Thus, the addressing sequence is N, (N+1 and N+M+1), N, N+1, (N+2 and N+M+2), N+1, N+2, (N+3 and N+3+M), N+2 and so on. In accordance with the present invention, the pattern of APS row addressing is two steps forward and one step back. In particular:

Pixel row N is output after rows N, (N+1 and N+M+1), N are accessed,
Pixel row N+1 is output after rows N, N+1, (N+2 and N+M+2), N+1 are accessed, and
Pixel row N+2 is output after rows N+2, (N+3 and N+3+M), N+2 are accessed.

BRIEF DESCRIPTION OF THE DRAWINGS

FIG. 6 is a flow chart diagram of the sequential logic for scanning an array of active pixel sensors and computing the APS offset voltage to cancel pattern noise in accordance with the present invention.

DETAILED DESCRIPTION

Figure 1:
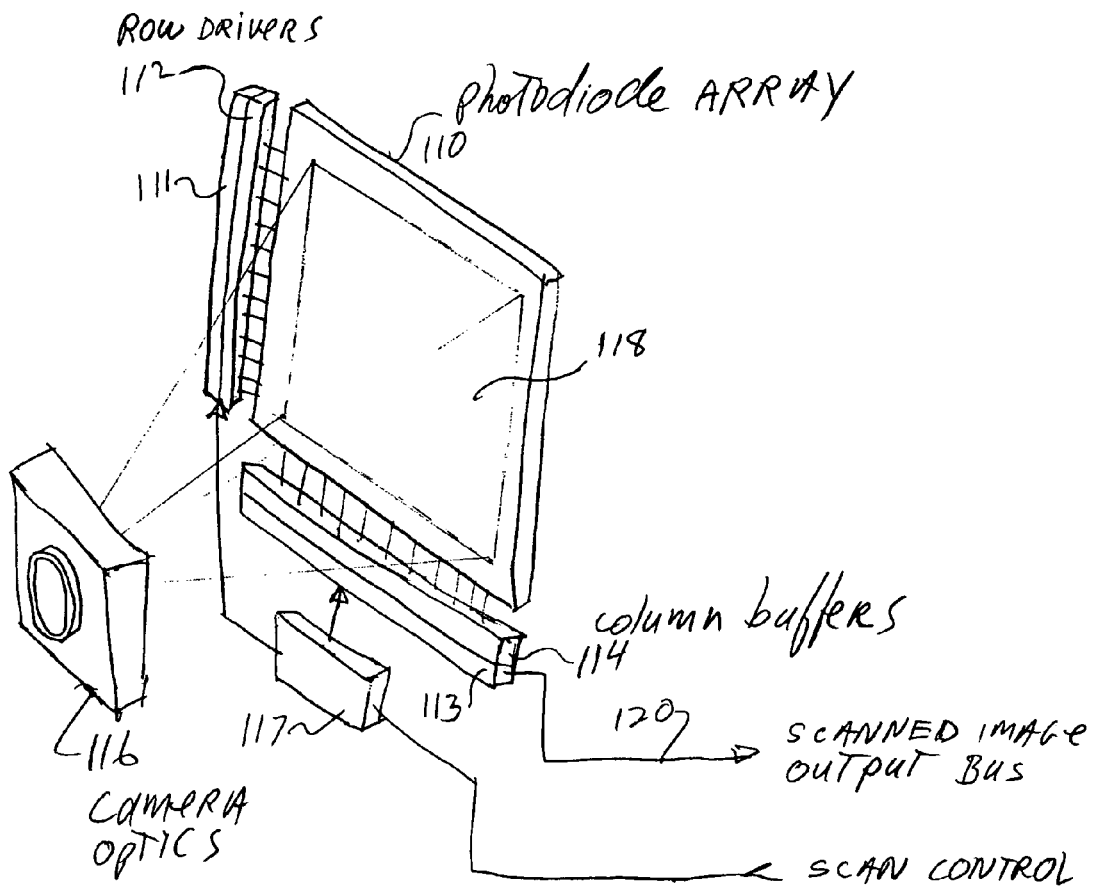
FIG. 1 is an isometric drawing of photodiode array for use in a digital camera in accordance with the present invention.

A digital camera incorporating a photodiode array 110 of active pixel sensors (APS cells) is shown in FIG. 1. The photodiode array 110 includes an image area composed of APS cells onto which the camera optics 116 projects a focused image 118. Each APS cell contains a photodiode and an active source follower amplifier. The photodiode array 110 is addressed row by row via a plurality of row drivers 112. Each of the row drivers 112 is driven by a respective storage element of the vertical shift register 111. The stored pixels in each row are sensed by a plurality of column drivers 114. After the pixel values from the column buffers are stable, the row of pixel values is loaded into a shift register 113 for readout 120. In the alternative, the rows and columns of the array 110 may be accessed and sensed, respectively, by using independent address decoders in lieu of shift registers.

In operation with a mechanical or electromechanical shutter, the camera optics 116 opens a shutter and exposes the photodiode array 110 to an image. After the shutter closes, row drivers 112 responsive to shift register 111 under the control of control logic 117, scan the photodiode array 110 row by row. As each row is accessed, column drivers 114 capture the pixel data incident on the photodiode array 110, which pixel data is then loaded into the shift register 113, and read out serially on a scanned image output bus 120. For a simple scan, the shift register 111 is reset, and a single binary 1 is loaded by the scan control 117. Thereafter, the single binary 1 is shifted through the register 111, activating one row driver at a time until all the rows of the array 110 have been scanned.

In the alternative, the camera optics 116 continuously exposes the photodiode array 110 to an image. Row drivers 112 under the control of control logic 117 and shift register 111 reset the photodiode array 110 row by row. Then, after a fixed time interval following each such row reset, row drivers responsive to the shift register contents, scan the same row in the photodiode array 110. As each row is reset and then accessed one image exposure time interval after being reset, column drivers 114 capture the pixel data incident on the photodiode array 110. The pixel data is then read out serially on a scanned image output bus 120. For such scan pattern, the shift register 111 is reset, and a binary is loaded into the shift register 111 by the scan control 117. Thereafter, the binary pattern is shifted through the register 111, activating appropriate the row driver or row drivers at one time until all the rows of the array 110 have been scanned.

Figure 5:
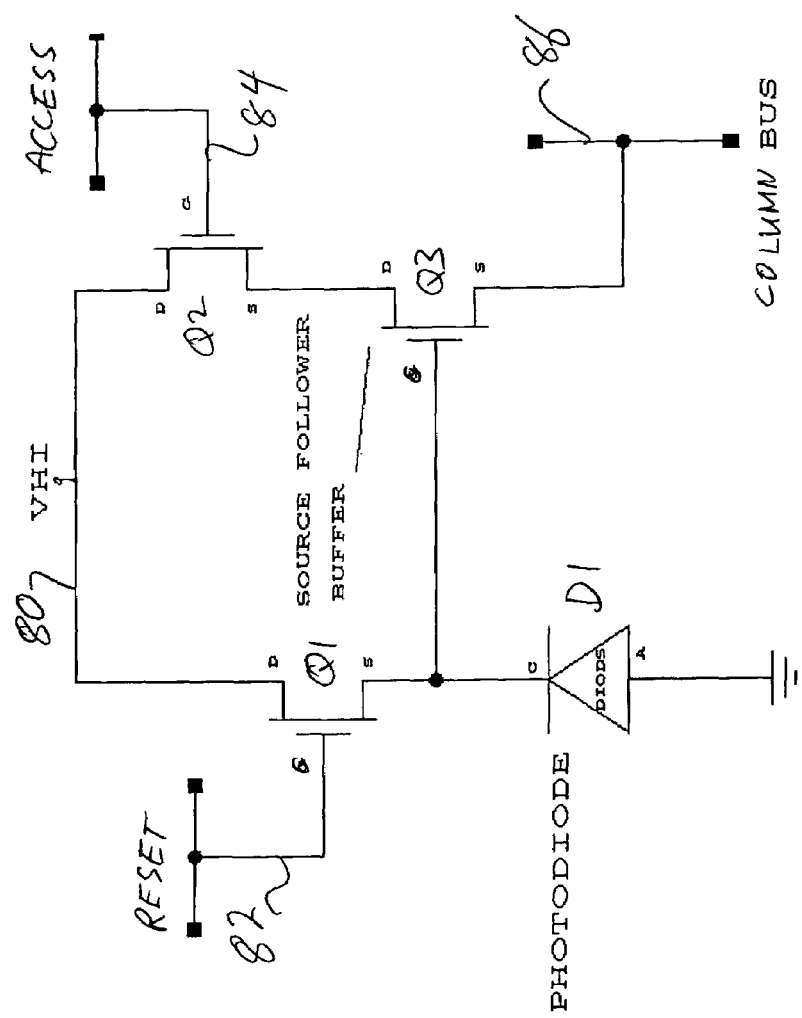
FIG. 5 is a schematic diagram of an active pixel sensor in accordance with the prior art.

Each APS cell (shown in FIG. 5) contains a photodiode D1 and three field effect transistors, Q1, Q2 and Q3. Transistor Q1 is connected as a pull up transistor from the anode of photodiode D1 to the positive power supply terminal VH1. The junction capacitance of the photodiode D1 is typically very small, perhaps no more than 5 picofarads. As a result, a buffer amplifier is needed to measure the voltage on the anode of the photodiode D1. The source follower N channel field effect transistor Q3 provides the buffering (amplification) function. Transistor Q3 is an source follower current amplifier connecting the photodiode D1 to the column bus 86. Transistor Q2 is a pull up device that enables the source follower Q3. The APS cell thus has three terminals: reset 82, access 84 and column bus output 86.

In operation, the reset line 82 is pulsed briefly to a high voltage. The reset transistor Q1 is briefly turned on, resetting the photodiode D1 by charging its parasitic junction capacitance to VHI. After the reset transistor Q1 is turned off (the reset signal on terminal 82 goes to ground), incident light on the photodiode D1 begins to discharge the photodiode junction capacitance. At the end of the exposure interval (shutter time), the voltage on the photodiode D1, having been discharged by an amount proportional to the incident optical illumination, represents one pixel of a captured image.

To access the voltage stored on the diode, the buffer source follower Q3 is activated by turning on the access transistor Q2 high voltage on access node 84 in series with the drain of the source follower Q3. The source follower circuit is completed by a common negative current source at the end of each column bus.

Figure 2:
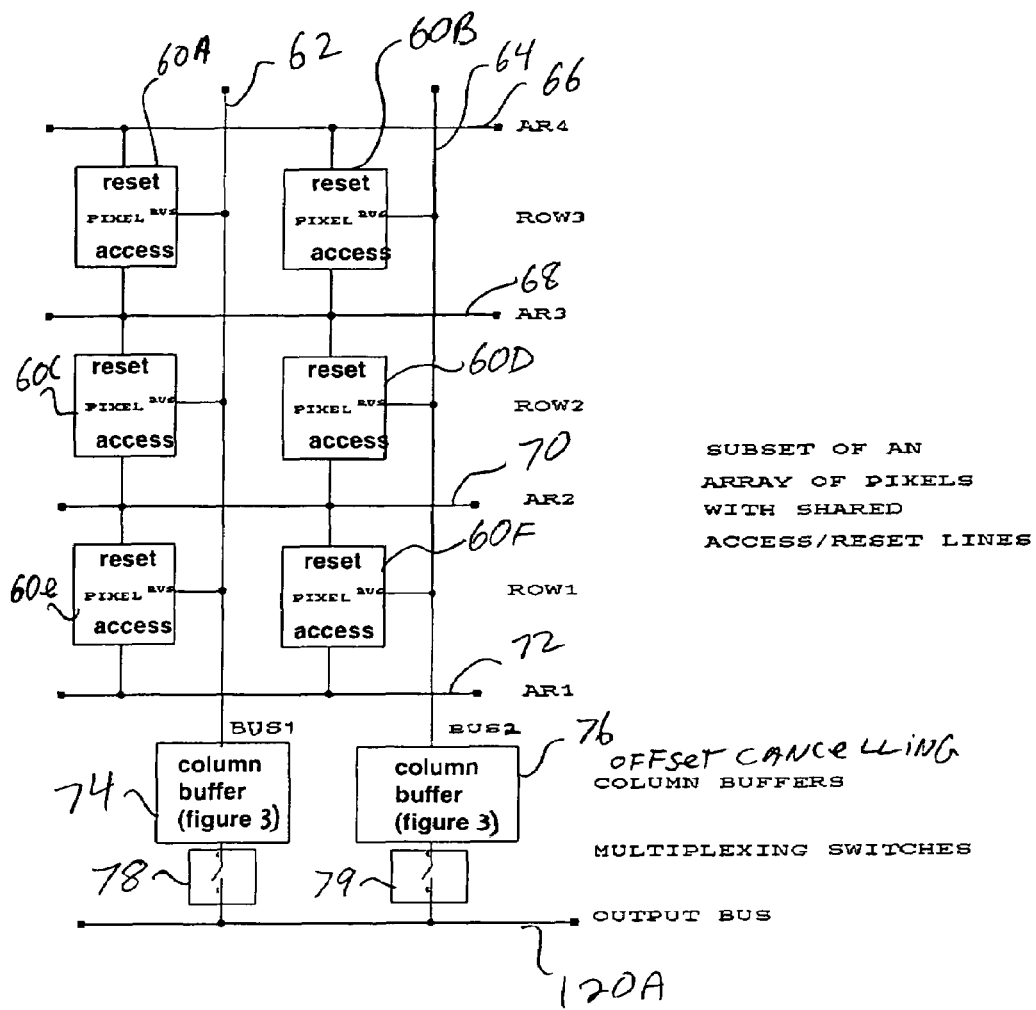
FIG. 2 is a schematic diagram partially in block form of an array of active pixel sensors in accordance with the present invention.

FIG. 2 shows a plurality of APS cells (the photodiode and active amplifier combination also referred to herein as "pixels") assembled into a two dimensional array to form an imaging chip. A two by three array of pixels (60A–60F) is shown, but the actual chip would typically have perhaps 1000 rows and 1000 columns. In particular, pixels 60A and 60B form row 3, pixels 60C and 60D form row 2 and pixels 60E and 60D form row 1.

Typically each row of pixels has a common reset line which resets all the APS cells in a given row. Similarly, each row has a common access line, which accesses all the APS cells in a given row. The pixel array in FIG. 2 has common merged access and reset lines. Specifically, access/reset line 70 (AR2) simultaneously resets row 1 (60E, 60F) while accessing row 2 (60C, 60D). Also, access/reset line 68 (AR3) simultaneously resets row 2 (60C, 60D) while accessing row 3 (60A, 60B).

Each pixel in a selected (accessed) row will drive one column bus. In particular, pixels 60A, 60C and 60E drive column bus 62, while pixels 60B, 60D and 60F drive column bus 64. However, only one row is selected at a given time, so that only one pixel drives a given column at any given time. Each column is connected to a column buffer 74, 76 to receive and process the signal for each column bus 62, 64. Finally, switches 78, 79 form a mutiplexer to select the column buffer output signals, one at a time, to the scanned image output bus 120A.

Figure 3:
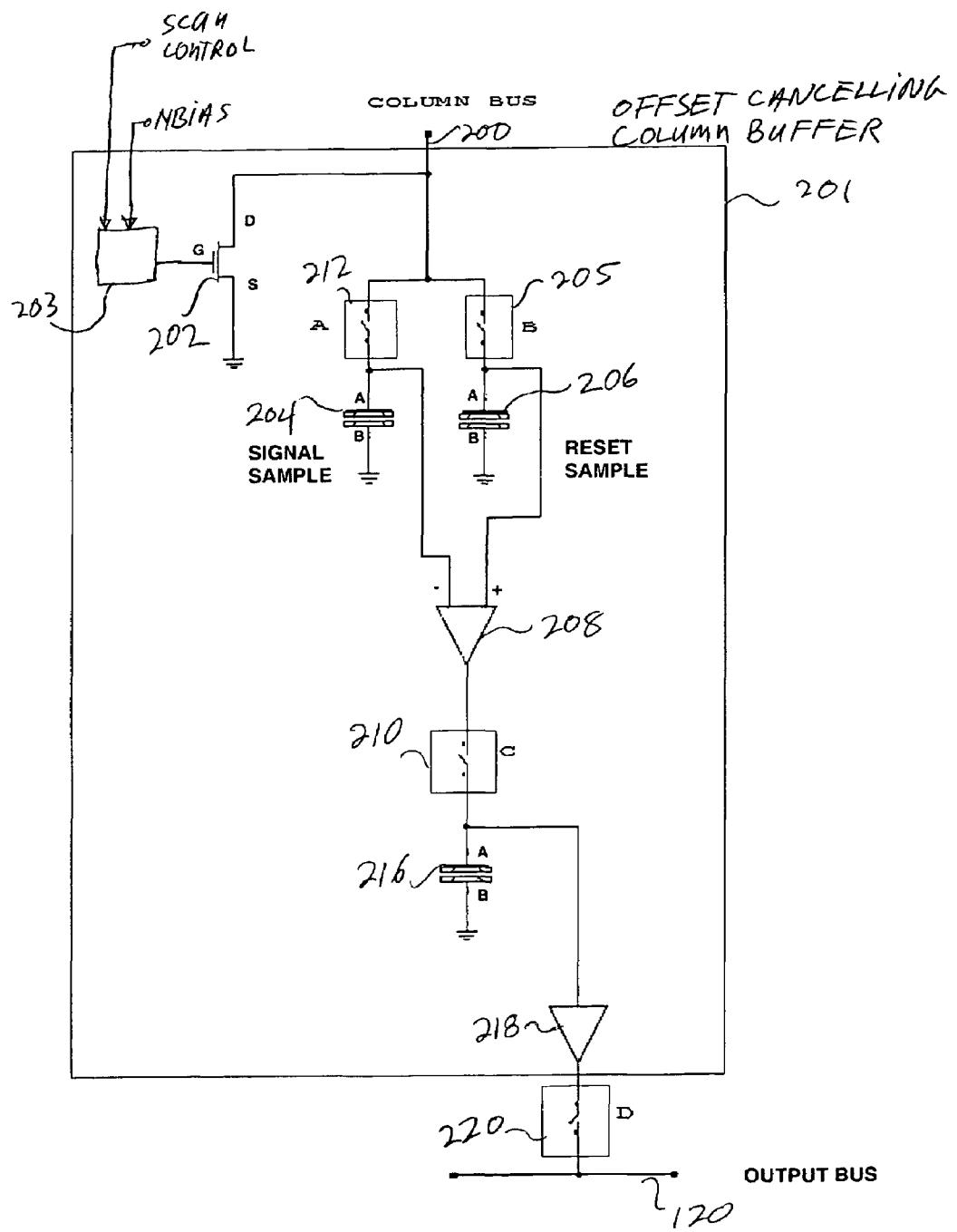
FIG. 3 is a schematic diagram partially in block form of a column buffer for use with an array of active pixel sensors in accordance with the present invention.

FIG. 3 shows a schematic diagram of an offset canceling column buffers 201 (block 74 or block 76 in FIG. 2). The offset canceling column buffer 201 includes an N channel field effect transistor 202 coupled to the column bus 200. The gate electrode of transistor 202 is coupled to a multiplexer 203, which is responsive to a scan control signal. Multiplexer 203 is responsive to the scan control signal to apply a bias (NBIAS) that conditions transistor 202 to act as a pull down transistor to complete the selected source follower circuits in each of the selected row APS cells connected to the column bus 200. Multiplexer 203 further responsive to the scan control signal to effectively remove transistor 202 from the column bus 200 and not complete the selected source follower circuits.

A first switch 212 (switch A) is used to sample the APS pixel signal level from the column bus 200. A second switch 205 (switch B) is used to sample the APS reset signal level from the column bus 200. Switch A is coupled to a first analog capacitive memory 204 that stores an APS pixel signal sample (an analog value). Switch B is coupled to a second analog capacitive memory 206 that stores an APS reset signal sample (also an analog value). A differential amplifier 208 having a first (inverting) input coupled to the signal sample memory 204 and a second (non-inverting) input coupled to the reset signal sample memory 206 subtracts the APS reset signal sample from the APS pixel signal sample. The differential amplifier 208 can be any apparatus that takes the difference between two inputs to produce a difference output. Furthermore, the second memory element 206 may be eliminated. That is, by not storing the APS reset signal sample, but instead taking the difference between the APS reset signal sample and the stored APS pixel signal and storing the result on memory element 216 in one step, will avoid the need to have a second memory element 206.

The output of the differential amplifier 208 is the corrected APS pixel signal value or true photodiode voltage (corrected for the random offset voltage), i.e., the sampled APS pixel signal value minus the sampled APS reset signal value. A third capacitive memory 216 (the output sample memory used for sampling and storing the corrected APS pixel signal value), is coupled via a third switch 210 (switch C) to the output of the offset canceling column buffer 201 via a buffer amplifier 218. In such manner, the column buffer 201 cancels the pattern noise caused by the random offset voltage of the individual source follower current amplifier in each individual APS cell.

The output of the offset canceling column buffer 201 is coupled to the output bus 120B via a multiplexer switch D (220 in FIG. 3, or 78, 79 in FIG. 2). The multiplexer switches 220 read out the selected row in the photodiode array by selecting one column at a time from the selected row in the photodiode array. Switch D is operated sequentially for each column buffer and connects the column buffer 200 to the chip output bus 120, such that only one such switch D in a column buffer may be closed at any one time. While signal and reset values from one row are being sampled, the data from the previous row is being multiplexed out on the output bus 120 via switch D. In the alternative, a shift register (113 in FIG. 1) may be loaded in parallel and clocked to provide a serial output.

Figure 4:
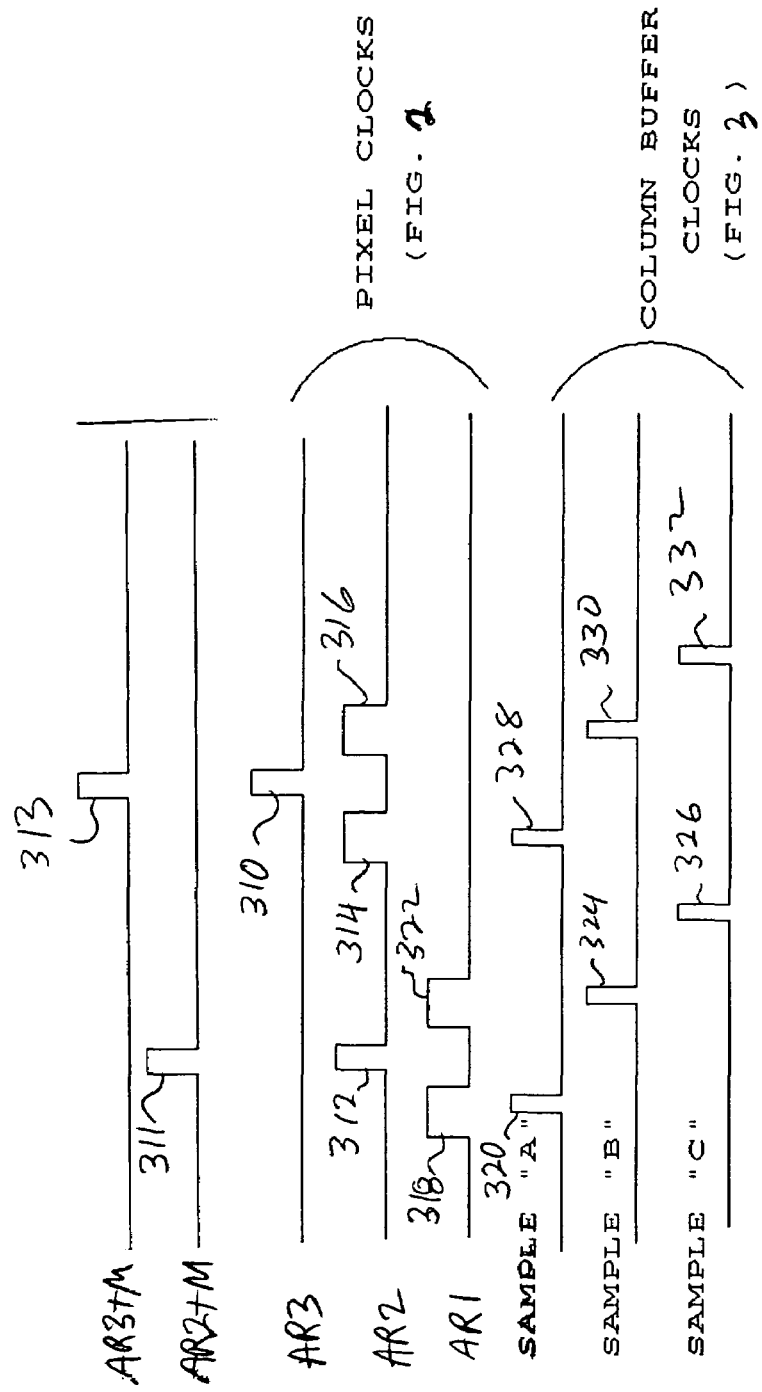
FIG. 4 is a timing diagram of control signals for a column buffer and an active pixel sensor array in accordance with the present invention.

FIG. 4 illustrates the timing relationship between the operation of switches A, B and C of FIG. 3, and the access/reset lines, AR1, AR2 and AR3 of FIG. 2. In operation, access/reset line AR1 is activated by timing pulse 318 in FIG. 4, which causes the respective pixel values of the APS cells of row 1 to be placed on the column buses 62, 64 (FIG. 2). While timing pulse 318 is active, and pixel data is on the column bus, timing pulse 320 causes switch A (212 in FIG. 3), to close briefly thereby storing a sample of the APS pixel signal value in the signal sample memory (204 in FIG. 3). After the APS pixel signal sample is stored, AR1 becomes inactive when timing pulse 318 ends.

Now, timing pulse 312 (FIG. 4) activates the access/reset line AR2 of the next row (row 2 in FIG. 2), which causes the respective pixel values of the APS cells of row 2 to be placed on the column buses 62, 64 (FIG. 2). The pixel values of row 2 are ignored. The purpose of timing pulse 312 is to reset the APS cells or row 1 via access/reset line AR2 (70 in FIG. 2).

At the same time, timing pulse 311 activates the access/reset line AR2+M of a future row, M+1 rows away from the current row. Activating AR2+M causes the respective pixel values of the APS cells of row M+1 to be placed on the column buses 62, 64 (FIG. 2). The pixel values of row M+1 are ignored. The purpose of timing pulse 311 is to initiate an image exposure time interval for row M by resetting the APS cells of row M via access/reset line AR2+M. In any event, the pixel values of two rows (row 2 and row M+1) will be placed on the column buses 62, 64 (FIG. 2) at the same time causing a conflict and rendering the readout data meaningless. However, as indicated, the data is ignored. Furthermore, pull down transistor 202 (FIG. 4) may be switched off during the time access/reset pulses 312 and 311 are active. By turning off the column pull down transistor, the selected source follower circuits in each of the simultaneously selected rows (row 2 and row M+1) is not completed.

Next, the access/reset line AR1 is activated a second time by timing pulse 322 in FIG. 4, which causes the respective values of the APS cells of row 1 to be placed on the column buses 62, 64 (FIG. 2). At this time row 1 is reset. The APS reset signal values are placed on the column busses 62, 64. While timing pulse 322 is active, and reset data is on the column bus, timing pulse 324 causes switch B (205 in FIG. 3), to close briefly thereby storing a sample of the APS reset signal value in the reset sample memory (206 in FIG. 3). After the APS reset signal sample is stored, AR1 becomes inactive when timing pulse 322 ends. Finally, timing pulse 326 closes switch C (210 in FIG. 3) to store a corrected APS pixel signal value for row 1 in the output sample memory 216.

The next row (row 2) is accessed in a similar manner. Access/reset line AR2 is activated by timing pulse 314 in FIG. 4, which causes the respective pixel values of the APS cells of row 2 to be placed on the column buses 62, 64 (FIG. 2). While timing pulse 314 is active, and pixel data is on the column bus, timing pulse 328 causes switch A (212 in FIG. 3), to close briefly thereby storing a sample of the APS pixel signal value in the signal sample memory (204 in FIG. 3). After the APS pixel signal sample is stored, AR2 becomes inactive when timing pulse 314 ends.

Now, timing pulse 310 (FIG. 4) activates the access/reset line AR3 of the next row (row 3 in FIG. 2), which causes the respective pixel values of the APS cells of row 3 to be placed on the column buses 62, 64 (FIG. 2). The pixel values of row 3 are ignored. The purpose of timing pulse 310 is to reset the APS cells or row 2 via access/reset line AR3 (68 in FIG. 2).

At the same time, timing pulse 313 activates the access/reset line AR3+M of a future row, M+1 rows away from the current row 2. Activating AR3+M causes the respective pixel values of the APS cells of row M+2 to be placed on the column buses 62, 64 (FIG. 2). The pixel values of row M+2 are ignored. The purpose of timing pulse 313 is to initiate an image exposure time interval for row M+1 by resetting the APS cells of row M+1 via access/reset line AR3+M. In any event, the pixel values of two rows (row 3 and row M+2) will be placed on the column buses 62, 64 (FIG. 2) at the same time causing a conflict and rendering the readout data meaningless. However, as indicated, the data is ignored. Furthermore, pull down transistor 202 (FIG. 4) may be switched off during the time access/reset pulses 310 and 313 are active. By turning off the column pull down transistor, the selected source follower circuits in each of the simultaneously selected rows (row 3 and row M+2) is not completed.

Next, the access/reset line AR2 is activated a second time by timing pulse 316 in FIG. 4, which causes the respective values of the APS cells of row 2 to be placed on the column buses 62, 64 (FIG. 2). At this time row 2 is reset. The APS reset signal values are placed on the column busses 62, 64. While timing pulse 316 is active, and reset data is on the column bus, timing pulse 330 causes switch B (205 in FIG. 3), to close briefly thereby storing a sample of the APS reset signal value in the reset sample memory (206 in FIG. 3). After the APS reset signal sample is stored, AR2 becomes inactive when timing pulse 316 ends. Finally, timing pulse 332 closes switch C (210 in FIG. 3) to store a corrected APS pixel signal value for row 2 in the output sample memory 216.

A flow chart illustrating the row addressing and read out scheme to suppress pattern noise suppression is shown in FIG. 6. The present invention allows the pattern noise to be eliminated from a photodiode array using a shared row access and reset line architecture.

The current row 1 is accessed at step 510. The APS pixel data signal for row 1 is stored in the column buffer at step 512. Then the next row 2 is accessed at step 514, but the image data signal for row 2 is ignored. The purpose of step 514 is to reset row 2. The APS pixel data for row 2 is ignored at this time. In addition, the image exposure time (shutter time interval is set at step 514 by resetting a row of the photodiode array located M rows ahead of the current row. To reset the row M rows ahead, the row at row 2+M is accessed at this time. The image exposure time is determined by the selection of M. The image exposure time will be equal to the selected value of M (number of rows ahead) multiplied by the time it takes to scan each row in the photodiode array.

Finally, the previous row 1 is again accessed by raising the voltage on AR2, again connecting row 1 data to the buses at step 516. Since the row 1 APS cells were just previously reset at step 514, the column busses now contain the APS cell reset levels. The measured reset sample for row 1 is subtracted from the previously sampled signal for row 1 at step 518 to output the offset corrected image at step 520. The offset corrected image signal is a measure of the true pixel illumination with the source follower buffer offset removed. The process is repeated 524 for the next row (row 2) at step 522 and continued until the last row is encountered at step 524.

What is claimed is:

1. In a semiconductor imaging chip having a plurality of active pixel sensors arranged in an array of rows and columns, each active pixel sensor having a respective internal offset voltage output superimposed on its respective active pixel sensor output, and wherein a current row of said array has an access line shared with a reset line of a previous row of said array to form a shared access/reset line which simultaneously accesses said current row and resets said previous row, a method for canceling the internal offset voltage appearing at the output of a given active pixel sensor on said current row to form a corrected output, said method comprising:

accessing a first row of said array to obtain a first sample of said given active pixel sensor output;

storing said first sample of said given active pixel sensor output of said first row of said array;

accessing a second row of said army, said first row of said array being the previous row to said second row of said array; and thereafter, accessing said first row of said array a second time to obtain a second sample of said given active pixel sensor output;

storing said second sample of said given active pixel sensor output of said first row of said array; and subtracting said second sample from said first sample to form said corrected output from said given active pixel sensor.

2. A method in accordance with claim 1, said method comprising:

accessing a third row of said array, said first row of said array being a predetermined number of rows previous to said third row, whereby said method sets the image exposure time of said third row.

3. A method in accordance with claim 2, wherein said step of accessing said third row of said array occurs substantially simultaneously with said step of accessing said second row of said array.

4. In a semiconductor imaging chip having a plurality of active pixel sensors arranged in an array of rows and columns, wherein a current row of said array has an access line shared with a reset line of a previous row of said array to form a shared access/reset line which simultaneously accesses said current row and resets said previous row, a method for accessing the pixel signal values of said active pixel sensors, wherein each active pixel sensor has a respective internal offset voltage output superimposed on its respective active pixel sensor output, and said method further includes canceling the respective internal offset voltage appearing at the output of a given active pixel sensor on said current row to form a corrected output, said method comprising:

accessing row N of said array a first time;

storing a first sample of said given active pixel sensor of row N of said array during said first time;

accessing row N+1 of said array said row N of said array being the previous row to said row N+1 of said array;

storing a second sample of said given active pixel sensor of row of N of said array during said second time;

thereafter accessing row N of said array a second time, and subtracting said second sample from said first sample to form said corrected output from said given active pixel sensor.

5. A method in accordance with claim 4, wherein said method further includes setting the image exposure time of said semiconductor imaging chip, said method comprising:

accessing row N+1+M of said array, where M is a predetermined number of rows, whereby said method sets the image exposure time of said third row.

6. A method in accordance with claim 5, wherein said step of accessing said N+1+M row of said array occurs substantially simultaneously with said step of accessing said row N+1 of said array.

7. In a semiconductor imaging chip having a plurality of active pixel sensors arranged in an array of rows and columns, wherein a current row of said array has an access line shared with a reset line of a previous row of said array to form a shared access/reset line which simultaneously accesses said current row and resets said previous row, a method for accessing the pixel signal values of said active pixel sensors, said method comprising:

accessing row N of said array a first time;

accessing row N+1 of said array, said row N of said array being the previous row to said row N+1 of said array;

accessing row N+1+M of said array, where M is a predetermined number of rows; and thereafter;

accessing row N of said array a second time, whereby said method sets the image exposure time of said row N+1+M; and wherein said step of accessing said N+1+M row of said array occurs substantially simultaneously with said step of accessing said row N+1 of said array; and wherein each active pixel sensor has a respective internal offset voltage output superimposed on its respective active pixel sensor output, and said method further includes canceling the respective internal offset voltage appearing at the output of a given active pixel sensor on said current row to form a corrected output, said method further comprising:

storing a first sample of said given active pixel sensor of row N of said array during said first time;

storing a second sample of said given active pixel sensor of row of N of said array during said second time; and subtracting said second sample from said first sample to form said corrected output from said given active pixel sensor.

* * * * *